United States Patent [19]
Bombelli et al.

[11] 4,092,046
[45] May 30, 1978

[54] PNEUMATIC FEEDER-DISPENSER FOR BULK MATERIAL

[75] Inventors: Nino Bombelli, Urdorf; Willy Trutmann, Widen-Mutschellen, both of Switzerland

[73] Assignee: Spribag Aktiengesellschaft, Widen-Mutschellen, Switzerland

[21] Appl. No.: 580,713

[22] Filed: May 27, 1975

[30] Foreign Application Priority Data

May 31, 1974 Switzerland .................. 7474/74

[51] Int. Cl.² .............................. B65G 53/46
[52] U.S. Cl. ..................... 302/49; 222/194; 222/370
[58] Field of Search .............. 302/49; 222/194, 370; 137/375

[56] References Cited
U.S. PATENT DOCUMENTS

| | | | |
|---|---|---|---|
| 2,193,235 | 3/1940 | Jones et al. | 222/370 |
| 2,299,565 | 10/1942 | Colburn | 302/49 |
| 2,550,781 | 5/1951 | Colburn | 222/370 |
| 3,076,580 | 2/1963 | Heath | 302/49 |
| 3,281,022 | 10/1966 | De Jarnett | 222/194 |

*Primary Examiner*—John J. Love
*Assistant Examiner*—Jeffrey V. Nase

[57] ABSTRACT

A feeder-dispenser for conveying measured amounts of bulk materials, in particular for mortar and concrete, in which a rotor is mounted on a driving shaft, and placed between a pair of stationary cover discs. The rotor is formed of a plurality of chambers regularly distributed about its periphery and open at each end. The chambers are covered on their internal surfaces with an elastic material lining. The top disc has a feed orifice and an air supply opening angularly offset from it. The bottom disc is provided opposite the air supply opening with a discharge orifice. Air under compression ejects the material from the chamber and cooperates with the elastic lining to prevent retention and deposition of material in the chamber.

10 Claims, 4 Drawing Figures

PNEUMATIC FEEDER-DISPENSER FOR BULK MATERIAL

BACKGROUND OF THE INVENTION

The present invention relates to a pneumatic feeder dispenser for bulk materials arranged to progressively dispense measured amounts of bulk materials such as mortar, sand, gravel and particularly prepared cement employed in pressure spraying and injection forming processes.

Feeders of such materials have been known. For example, in Swiss Patent No. 432,360 a feeder is disclosed in which a body is provided with a plurality of chambers uniformly spaced about its periphery. Each of the chambers is open at both ends and arranged to run parallel to the rotational axis of the body. One of the front ends of the body is covered by a housing in which a material delivery slot is provided on one side and an inlet slot is provided on the other side. An analogous housing having a material outlet aligned with the air inlet slot aperture is provided to cover the other frontal end of the body. The material to be transported arrives from a bunker or a similar delivery device into the delivery slot in the upper housing cover and passes through said slot progressively into each of the chambers of the rotor body which body indexes at timed intervals. The rotor body indexes continuously at a speed of for instance ten revolutions per minute and the feed and speed of rotation are matched to one another in such a manner that the chambers become sequentially filled with the bulk material to be transported. The air inlet and material outlet are normally offset by 180° from the delivery slot so that as the rotor indexes, pressurized air is forced into the air inlet forcing the material in the aligned chamber out the outlet opening.

A similarly constructed and operational compressed air conveyor device is disclosed in German Patent No. 485,983.

In practice, the bulk material feeders of the prior art present considerable difficulties when they are required to forward moist material. In operation such moist material becomes deposited inside the chambers of the rotor body in fine particles which builds up in increasing layers upon the chamber walls. Ultimately this decreases the capacity of each chamber and, finally, results in the chambers becoming incapable at all of transporting material. In order to maintain the said feeder in operative condition, it has become necessary to cleanse each chamber at least four times during every working shift. This is extremely laborious and costly, and a great loss of productivity and power is caused thereby. Such repeated interruption of operation for cleansing, requires the use of a second feeder inorder to ensure continuous throughput.

Another arrangement proposed in this field was disclosed in German Published Patent Application Number DAS 1,148,727. Such an arrangement comprises a housing within which a rotatable pocketed wheel is located. An exchangeable closing ring is located between the bottom of the wheel and of the housing, which can be replaced when clogged.

However, this does not satisfactorily meet the problem arising from the choking of the passages in the rotor so that a great deal of cleaning must still be made in order to maintain the device in operative condition.

It is therefore an object of the present invention to provide a peneumatic feeder-dispenser of the above type which overcomes the drawbacks and disadvantages of the known constructions.

Accordingly, it is another object of the present invention to provide a bulk material pneumatic feeder of the above type whose maintenance requirements are reduced to a minimum and which ensures a permanent continuous operation with little or no interruption in normal working patterns for cleansing.

It is still another object of the present invention to provide a bulk material pneumatic feeder comprising a rotor having regularly distributed over its periphery a plurality of chambers adapted to progressively receive and dispense the bulk material and wherein said material is prevented from forming sediments on the internal surfaces thereof.

It is a further object of the present invention to provide a bulk material pneumatic feeder of the type specified in which the bulk material sedimentation is prevented by an elastic rubber material lining covering at least in part the internal surfaces of the chambers.

BRIEF SUMMARY OF THE INVENTION

The present invention provides a bulk material pneumatic feeder-dispenser comprising a rotor body mounted on a drivable shaft. The body has regularly distributed around its periphery a plurality of receiving chambers and is covered at least on its upper and lower frontal faces by disc-like housings. The upper one of the housings is provided with a feed slot or aperture and in a position angularly offset therefrom with an air opening adapted to communicate with a source of compressed air. The lower one of the housings, includes a discharge aperture located oppositely to the compressed air opening. The feed slot is adapted to communicate with a bulk material hopper while the discharge aperture communicates with a material dispensing tube. The internal surfaces of each of the chambers in the rotor body is covered with an elastic lining having a smooth surface. The lining may be separable in the form of a hollow tube set within the chamber and held at each end thereby allowing the lining to vibrate or flexible, or it may be sprayed onto the surface of the chamber for the same effect.

In operation the lining prevents the bulk material (even wet cement) from adhering to and/or setting down on the internal walls of the chamber. The smooth walls permit the compressed sir streaming inwardly to force the bulk material to leave the chamber with relatively clean walls.

Full details of the present invention are set forth in the following desceiption and will be seen in the accompanying drawings.

DESCRIPTION OF THE INVENTION

Figure 1:
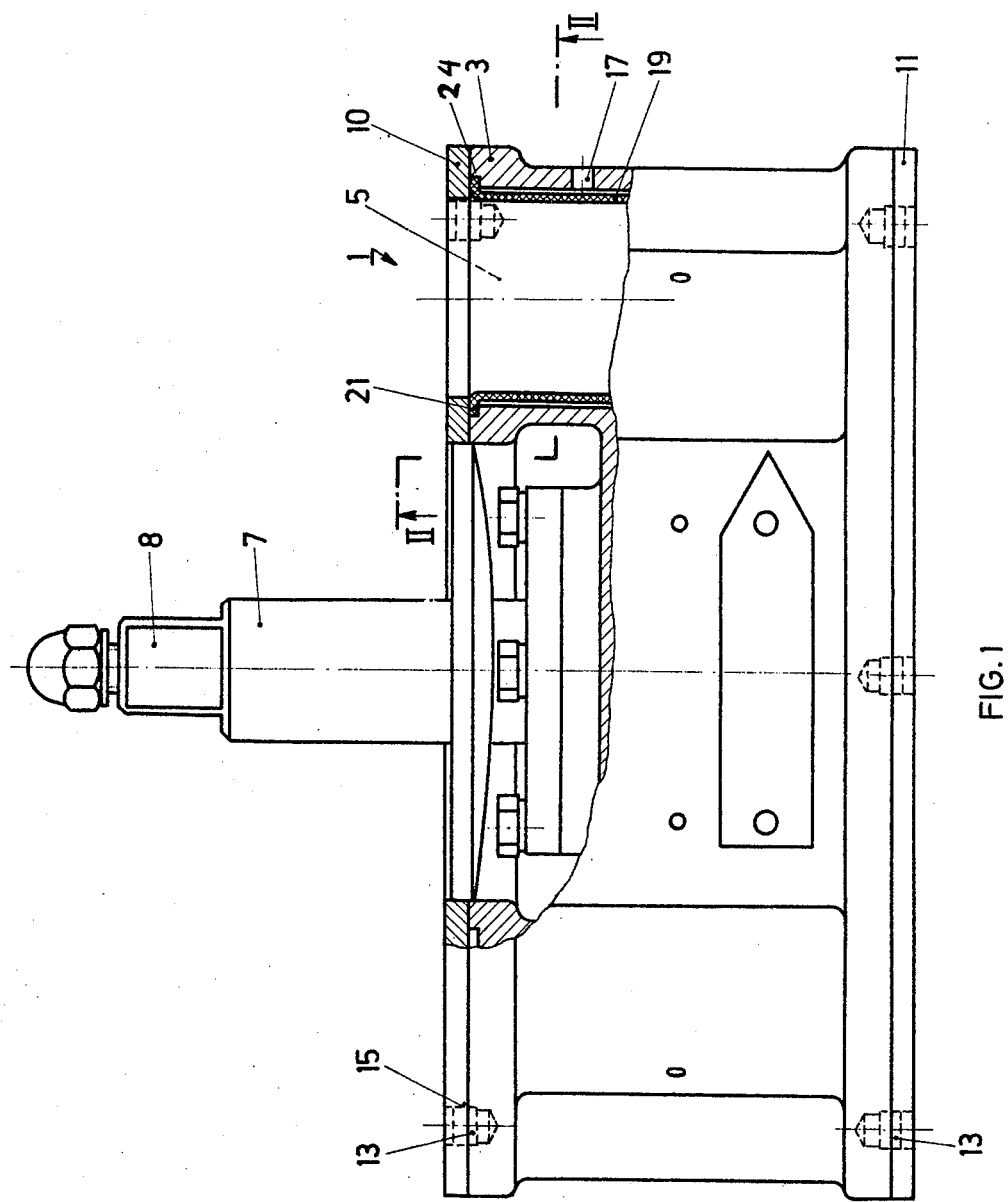
FIG. 1 is an elevational view partly in section, of the feeder-dispenser embodying the present invention.
Figure 2:
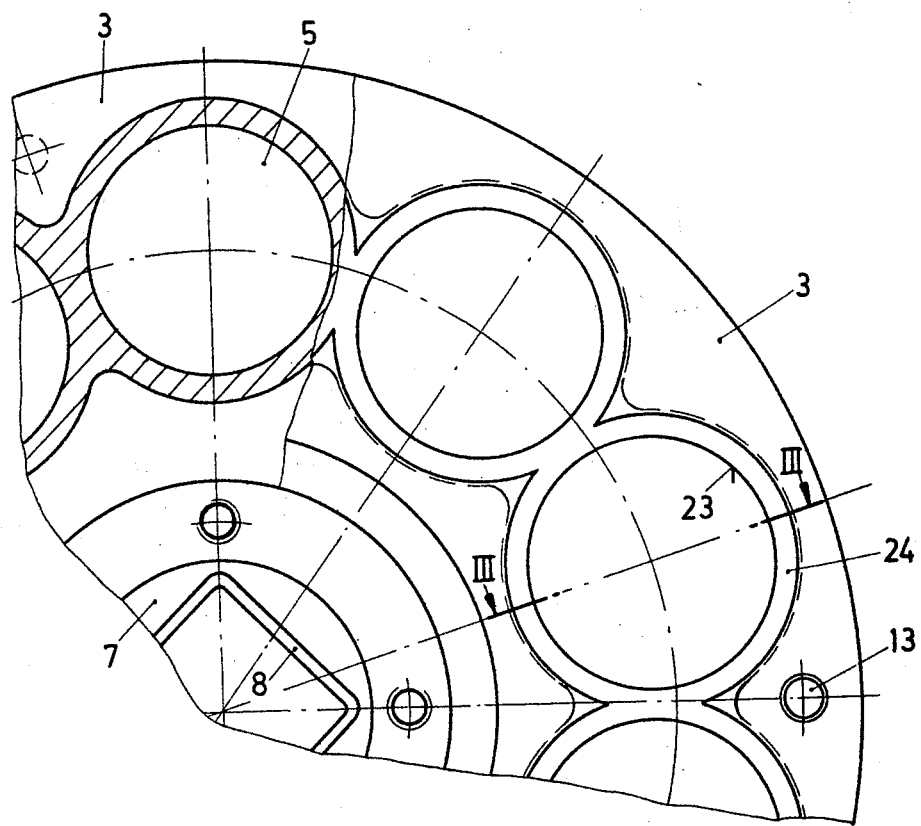
FIG. 2 is a partial sectional view of the feeder-dispenser illustrated in FIG. 1 taken along line II—II.
Figure 3:
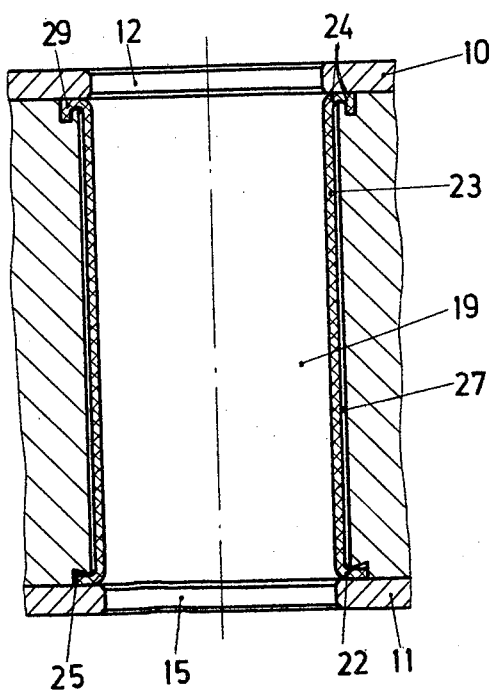
FIG. 3 is a vertical view of a chamber of the feeder-dispenser along line III—III in FIG. 2.

As seen in the FIGS. 1-3, the feeder-dispenser, generally depicted by the numeral 1 comprises a rotor assembly having a body 3 formed from a plurality of identical cylindrical hollow open ended chambers 5 arrayed in uniform manner about a central drive shaft 7 whose outer end is provided with a square cross-sectioned dog 8, adapted to be connected by conventional means to a driving source, such as a transmission, a motor, or the like. While the chambers are illustrated as cylindrical tubes other shapes can be employed, particularly one having a slightly downward outward concial taper.

The chambers 5 are held together at their upper and lower frontal ends by plates 10 and 11 respectively, which are provided with holes 12 about their periphery conforming to that position of the chambers. The plates 10 and 11 are joined to each of the chambers by suitable plug bolts 13 which thread into bores 15 extending through to the plates and the peripheral lip of the chambers. The plates and chamber assembly are joined by suitable webbing brackets or the like to the central drive shaft 7.

Each of the chambers 5 is provided with a radial hole 17 extending through its wall approximately midway between its ends. Finally, each chamber is provided with a tubular, conforming elastic lining 19, which covers substantially the entire length of its wall. The elastic material may be rubber, synthetic rubber or plastic or similar material which provides a smooth continuous surface and a resilient and flexible characteristic. The linings 19 may be formed to be self supporting, or at least shape retaining even though resilient and flexible. In this manner they resemble tubular hose sections.

To secure the linings 19, securely within the chambers 5, each is provided at their top and bottom ends respectively with radially outward annular flanges 21, 22, thus defining between them a central cylindrical work surface 23. The flanges 21 and 22 are adapted to seat within an annual cut-out groove 24 at each end of the chamber 5, and be squeezed, in force fit, into firm secure engagement by the end plates 10 and 11 respectively when the plates and chambers are joined. While the flanges are illustrated in FIG. 1 as planar, they may take other shapes, such as having a reverse bend 29 as seen in FIG. 3, or provided with an enlarged bulb-like formation or bead. It may also be found advantageous, in certain cases to provide the retaining annular slot with a dove-tail or tapered cross-section 25 as seen in FIG. 3.

The lining 19 is advantageously arranged at a distance from the internal surface of the chamber 5, so that an annular intermediate space 27 is provided separating the lining 19 from the wall of the chamber 5. Since the linings 19 are secured only at their ends, the space 27 provides some degree of freedom allowing elastic radial play. The radial hole 17 prevents entrappment of air and permits such play. In principle, it is also possible to provide linings on the walls of the chambers 5 with a directly deposited coating of a suitable elastic rubber material, glued on, sprayed on, poured onto or welded to the internal surface of the chamber 5, provided that the same degree of surface smoothness and elasticity is generally obtained.

Figure 4:
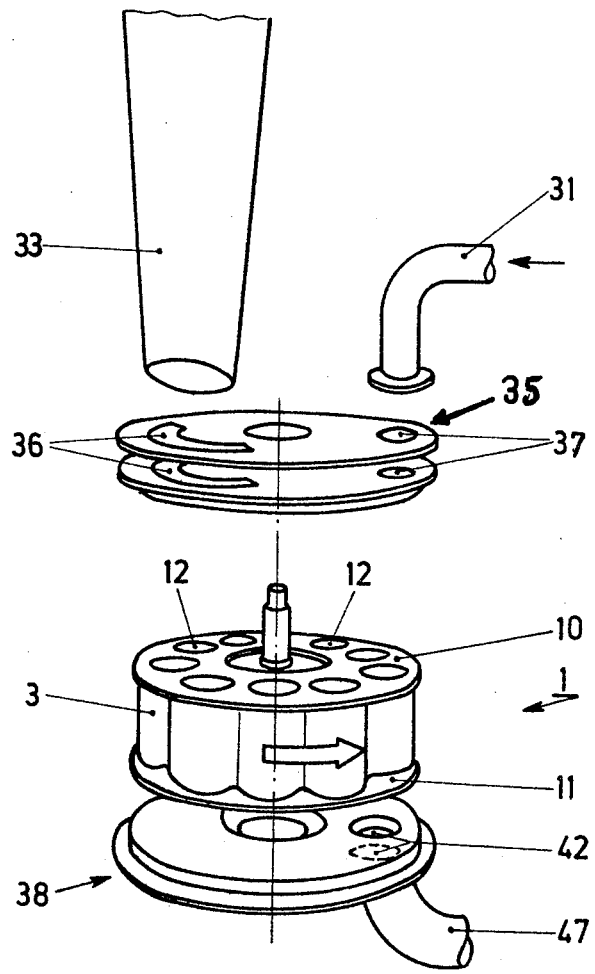
FIG. 4 is an exploded view of the feeder-dispenser of the present invention illustrating in enlarged detail the cover plates, the rotor body, pressurized air supply and inlet and discharge openings.

FIG. 4 shows an example of how a rotary body according to FIGS. 1 to 3 may be incorporated into a feeder-dispenser installation. On the upper side of such an installation, a compressed air supply duct 31 is provided, as well as a supply duct 33 for bulk material. The latter can be for instance in communication with the outlet of a bunker, a hopper, a cyclone feeder or the like, and may be provided with suitable dosing valves and feed controls.

A top and a bottom cover disc 35 and 38 comprising part of a stationary housing, is located opposite the respective frontal plates. The top cover disc 35 is of doubled structure (i.e., two superimposed layers) and is provided feed slot 36 aligned with both the duct 33 and the locus of the chambers 5; thus permitting passage of the bulk material into each of the chambers 5, i.e., each time a chamber 5 arrives under the slot 36. The slot 36 is actuated to permit sufficient space for the material to flow while the rotor body rotates. At approximately 180° diametrically opposite to the slot 36 is a hole 37 which is aligned to the air conduit duct 31 and the chambers 5. The bottom cover 38 is also a doubled structure, serving for discharging the bulk material. This cover is arranged on the lower side of the rotary body 3 and is provided with a dispensing aperture 42 and has attached thereto a transport and discharge pipe 47. The aperture 42 is in direct axial alignment with the air inlet duct 31.

The bulk material feeder-dispenser according to the present invention operates as follows:

The rotary body is set in motion, either continuously or in indexing intervals, so as to rotate in the direction of the arrow shown in FIG. 4.

The bulk material, which for example may be a concrete mass (gunned concrete) adapted to be sprayed or projected into a form or mold, is supplied via duct 33 through the feed slot 36 into one of chambers 5 which arrives at a given time interval below the feed slot. The material drops into and is received by the chamber 5 which is covered with the elastic material lining as previously described. During the further rotation of the pneumatic feeder, the chamber 5, having received a charge of the bulk material, continues moving under and past the feed slot 36 toward the outlet aperture 42. During the first half of the rotation of the chamber, the bottom cover plate 38 maintains the filled chamber 5 closed at its lower end. When however it arrives at a position where it is aligned between the compressed air supply duct 31 and the lower dispensing aperture 42, a strong impact of compressed air is supplied into the chamber 5. The surge of air empties the chamber and the bulk material is pneumatically ejected through the discharge pipe 47. Simultaneously, and continuously the succeeding chambers 5 passing beneath the supply duct 33 become filled with material and progress to the ejection station.

The lateral openings 17 in each of the chamber walls serve to immediately recognize a defective tube since the compressed air will escape laterally through the hole rather than through the discharge aperture.

It has been found that the incorporation of linings, as described or of equivalent internal coatings in the chambers 5 is very advantageous since such linings prevent any deposition of the bulk material in the rotary body, even when same is in a moist state. To ensure elasticity, the material of the lining 19 must be elastic, but it is not absolutely necessary to provide a spacing, such as that marked by the numeral 27, between the wall of the chamber 5 and the tubing 19 inserted therein.

It is very important, nevertheless, through appropriate assembling as described, of the chambers 3 and plates 10 and 11 into the rotor body, as well as through the appropriate assembly of the housing cover discs 35 and 38, as by the use of tie rods and the like, that the plates 10 and 11 securely seat and fasten the flanges 21 and 22 (or 29) in a good metal joint established by the ends of the chambers 5, the body 3 respectively and the end-plates 10 and 11, so that the considerable amount of heat which is generated during the feeding and dispersing operations can easily flow away. To this end the flat design of the flanges 21 and 22 has proven to be very serviceable. It is, moreover, not the regular cleaning operation of the rotor, which is periodically necessary, that has brought the prior art devices into disrepute, but the fact that the construction of the rotor body itself is so complex, that it is generally very badly damaged during cleaning and therefore had to be frequently replaced.

It is possible, in the present apparatus, to periodically impart to the exterior of each of the tubular linings 19, a surge of air under compression, which would tend to flex the lining and prevent any of the material from becoming permanently deposited thereon, or if deposited thereon to cause it to crack and fall off. This surge of air can be conveniently imparted into the radical hole 17 through a suitable manifold and valve arrangement built into the housing and connected to the source of pressurized air. As a rule, however, such measure will not be usually necessary since the elastic and repelling characteristics of the rubbery lining or coating material should be sufficient under normal operating conditions.

In practice, it is preferred that the linings be formed of elastomeric or rubber inserts or moldings of given shape, so that standard shapes and lengths can be provided. This enables a standard quality to be maintained and permits the user of the equipment to maintain supply in stock for easy and swift replacement should it be necessary. Replacement of the linings will be extremely simple due to the tie rod connection of the housing members, and the screw fastening of the plates to the chambers. Since the rotating plates 10 and 11 must display a strong resistance to abrasion compared to the housing cover discs 35 and 38, they are preferably made of tool steel. Further, to prevent unnecessary penetration of material between the housing cover discs 35 and 38 and the plates 10 and 11 respectively, it is preferred that they be closely spaced and braced together by the tie rods.

It is possible to form the tubular linings or coatings with central portions 23 of different shapes. They may be cambered (i.e. curved toward their central axis) or with a conical or tapering crosssection. The elastic lining may also be inserted in a metal pipe, and the entire structure seated in the chamber 5. The chamber 5 may itself be in the form of a removable pipe which can be removed and replaced as needed. As a result, the chamber insert and/or the insert-tubing can be formed more strongly and can be more easily placed in position, but they will of course be more expensive. In addition, the chambers 5 are illustrated as running parallel to the axis of rotation but it will be obvious that they may be obliquely arranged, for example, in an outward taper from top to bottom.

Various other modification changes and embodiments will be obvious to those skilled in the art. It is therefore intended that the present disclosure be taken as illustrative only of the invention and not limiting of its scope in any manner.

What is claimed is:

1. A feeder-dispenser for bulk material, such as mortar, concrete and the like, comprising a rotor mounted on a driving shaft to be rotated thereby and comprising a top frontal plate, a bottom frontal plate and a plurality of tubular material receiving chambers open at each end fixed between said plates, each of said chambers being at least partially covered on their internal surfaces with a tubular elastic material lining, secured at its ends with respect to said chamber and being flexibly distendable with respect to the wall of said chamber, the wall of each chamber being provided with a hole permitting movement of air between the lining and the chamber wall.

2. The feeder-dispenser according to claim 1, wherein said rotor is positioned between a pair of stationary cover discs, the cover disc located on top of said rotor being provided with a feed aperture and an air inlet opening angularly offset from said feed aperture, said feed aperture and inlet opening communicating respectively with a bulk material supply duct and a compressed air source, and the cover disc located under the bottom of said rotor being provided with a discharge aperture connected to a material dispensing duct which discharge aperture is positioned opposite said air inlet opening, said bulk material being expelled from the rotor by the impression of compressed air through said air inlet opening.

3. The feeder-dispenser according to claim 1, wherein said chambers extend parallel to the axis of rotation.

4. The feeder-dispenser according to claim 1, wherein said chambers extend obliquely to the axis of rotation.

5. The feeder-dispenser according to claim 1, wherein the lining comprises a tube inserted into each of the chambers.

6. The feeder-dispenser according to claim 5, wherein the tube is provided at each end with flanges and each chamber is provided with annular grooves at the upper and lower ends of the chamber wall for receiving said flanges.

7. The feeder-dispenser according to claim 6, wherein the flanges are flat.

8. The feeder-dispenser according to claim 6, wherein the flanges have shaped beads.

9. The feeder-dispenser according to claim 6, wherein at least one of the grooves of each chambers is tapered.

10. The feeder-dispenser according to claim 1, wherein said lining is spaced from the walls of the chambers.

* * * * *